Sept. 28, 1948.        H. G. BUSIGNIES        2,449,977
LOCATION INDICATING SYSTEM
Filed June 30, 1945
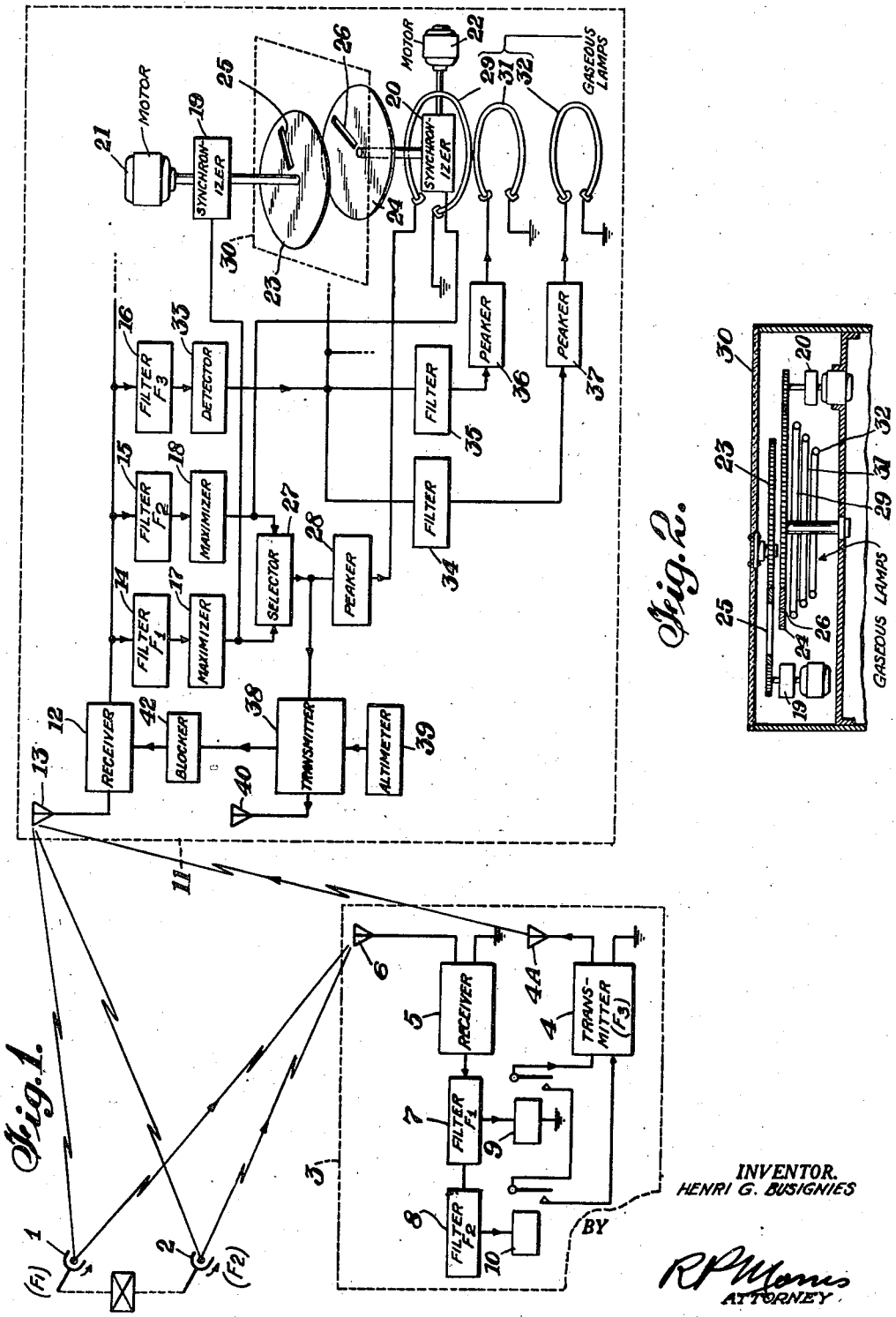
INVENTOR.
HENRI G. BUSIGNIES
BY
R P Morris
ATTORNEY Patented Sept. 28, 1948

2,449,977

UNITED STATES PATENT OFFICE 2,449,977

LOCATION INDICATING SYSTEM

Henri G. Busignies, Forest Hills, N. Y., assignor to Federal Telephone and Radio Corporation, New York, N. Y., a corporation of Delaware Application June 30, 1945, Serial No. 602,448

24 Claims. (Cl. 343—112)

This invention relates to navigational guiding and control systems and more especially to systems for indicating on a moving craft its orientation with respect to one or more distant points or objects.

A principal object of the invention relates to an improved system for indicating on a moving craft, the location of predetermined regions or objects with respect to the moving craft.

Another object is to provide an improved system for indicating on a moving craft its position with respect to a plurality of radiating sources or beacons of known geographical location; in conjunction with an indication of the orientation of one or more points or regions of unknown location and whose location must be identified on the craft.

A further feature relates to an improved arrangement for giving a continuous map indication of the location of one or more objects or regions with relation to the path travel of a moving craft and without requiring directionally sensitive pick-ups on the craft.

A feature of the invention relates to a craft guiding system employing a plurality of rotatable and highly directional radio beacons which are rotated at relatively different speeds so that the loci of their intersection scans a relatively wide region of space, in conjunction with one or more active repeaters located at selected intersection points and effective to transmit a signal to a moving craft only when the repeater is acted upon simultaneously by both beacons.

Another feature relates to a method for identifying the map location of one or more points or regions with respect to a moving craft by causing a signal to be momentarily radiated from each point or region when it is traversed or scanned simultaneously by a plurality of radiating beacons, the momentarily radiated signal being received by omni-directional receiving means on a moving craft to produce an indication for orienting the craft with respect to all of said points or regions.

A further feature relates to a radio range system for moving craft, wherein a pair of radiating beacons are synchronized with a corresponding pair of electro-optical scanners on a moving craft, together with repeaters located at predetermined points with respect to said beacons, the repeaters being active only when acted upon simultaneously by both beacons, and producing on the craft a momentary indication under control of said scanners to identify the craft location with respect to said beacons and with respect to said points.

Another feature relates to an improved radio range system for use on aircraft and the like to give visual indications of different color corresponding to the azimuthal and altitude data of respective objects or regions whose location relatively to the aircraft must be known, and without using the usual directionally sensitive direction finder radio receiving equipment on the aircraft.

A still further feature relates to the novel organization, arrangement, and relative location of parts which cooperate to provide an improved radio locating and guiding system for moving craft.

Other features and advantages not particularly enumerated will become apparent after consideration of the following detailed description and the appended claims.

In the drawing which shows one preferred embodiment;

Fig. 1 is a composite block-schematic diagram of a system embodying the inventive features.

Fig. 2 is a detailed view of part of the indicating equipment of Fig. 1.

Referring to Fig. 1, there are shown a pair of highly directive radio transmitting beacons 1 and 2. These beacons may be of any well-known construction and are arranged to be continuously rotated in the direction of the curved arrows each at a fixed rate, but with the rate of rotation of one beacon different from that of the other. Thus beacon 1 may be rotated at the rate of one revolution per second, while beacon 2 may be rotated at the rate of forty revolutions per second. The actual distance between the two beacon transmitters and their relative geographic positions are known and can be identified on a suitable transparent scale or map which forms part of the indicating equipment to be described. Since the beacons 1 and 2 are spatially displaced, the effect of their conjoint rotation is to cause their respective sharply directed beams to intersect at a relatively localized point or region and the loci of the intersection point is in the nature of a spiral which completely traverses or scans the region around both beacons.

Preferably each of the beacons radiates at a different radiating frequency, or if desired, they may radiate at the same frequency and each beacon can be identified by a characteristically different modulation whether it be a frequency modulation, or a pulse modulation of the pulse-width type, or a pulse modulation of the repetition-rate type such as are well-known in the radio modulation art.

It is very often required to be able to indicate on an aircraft or the like, the location of an obstacle or landmark with respect to the craft. Thus, numeral 3 represents such an obstacle or landmark. In accordance with one phase of the invention, there is provided at the point 3 a radio repeater comprising a radio transmitter 4 which is controlled by the output of a local radio receiver 5. The antenna 6 for the receiver 5 and the antenna for transmitter 4 are of the omni-directional type and preferably the radiating frequency of transmitter 4 is different from that of beacons 1 and 2. For simplicity in explanation, the frequency of beacons 1, 2 and transmitter 4 will be referred to as F1, F2 and F3. The receiver 5 is tuned to receive the signals from both of the beacons. Therefore receiver 5 will produce a signal in its output when the receiving antenna 6 picks up either or both beacons. However, in accordance with the invention, the transmitter 4 is arranged to be keyed on only when antenna 6 picks up both beacons simultaneously. For this purpose the two beacon frequencies, after amplification and detection, are passed through respective filters 7 and 8 whose respective outputs control any suitable and well-known keying circuit for transmitter 4. For illustrative purposes, each filter may control its respective relay 9 and 10 whose contacts in turn control the keying circuit of transmitter 4. It will be understood, of course, that while the drawing shows electromagnetic relays, vacuum tube or gas tube relays may be used in place thereof.

On each aircraft 11, there is provided a radio receiver 12 whose pick-up antenna 13 is of the omni-directional type so that there will appear in the output of the receiver 3 separate signals corresponding respectively to the frequencies F1, F2 and F3 above mentioned. Since the antenna 13 is of the omni-directional type, it will be excited directly by the beams when either or both of the radio beacons are aligned therewith. Receiver 12 will also be excited by the frequency F3 from transmitter 4, but only when both the beacons are in alignment with antenna 4A. The output of receiver 12 is divided into three separate channels corresponding to frequencies F1, F2 and F3, by means of respective filters 14, 15 and 16. The outputs of filters 14 and 15 are applied to respective maximizing devices or circuits 17, 18 which control respective motor synchronizing devices 19, 20 of any well-known kind. Devices 19, 20 are associated with respective driving motors 21, 22 and with respective rotatable scanning discs or elements 23, 24 spaced apart a distance scaled to represent the spacing of antennas 1 and 2, each of which has a scanning slot 25, 26 for purposes to be described. Preferably the devices 19 and 20 are start-stop switches or controls such as are well-known in the start-stop telegraph art. With this arrangement the motor 21 tends to drive the disc 23 at a slightly greater rate than the rate of rotation of beacon 1, and once per revolution the disc 23 is momentarily stopped under control of the stopping impulse received through device 17. This start-stop impulse will recur at a regular rate corresponding to the rate of rotation of beacon 1. It will be understood, of course, that the usual slip-friction clutch or the like (not shown) may be provided between the motor 21 and the start-stop device 19. Likewise, the start-stop device 20 for the disc 24 is controlled by the signal received through device 18, so that device 20 receives start-stop impulses at a regular rate corresponding with the rate of rotation of beacon 2. It will be understood, of course, that these synchronizing impulses are not dependent upon the conjoint excitation of the antenna 13 by both of the beacons. In other words, discs 23 and 24 will be synchronized at regular recurring intervals regardless of whether the two beacons are simultaneously aligned with antenna 13. It will be understood that any other well-known manner of synchronizing the discs 23, 24 from, and with, the respective beacons 1, 2 may be used. However at that particular point in the cycle of joint rotations of the beacons where both beacons act simultaneously on antenna 13, signals will appear at the output of both devices 17 and 18. The presence of both of these signals in the selecting device or circuit 27 results in a single control impulse which may be passed through any suitable "peaker" device or circuit 28 and applied to the gaseous discharge lamp 29. Lamp 29 may be of any suitable shape so that when it is illuminated, it lights up substantially the entire surface of disc 24. Device 27 may, for example, correspond to relays 9 and 10 as above described.

By suitable phasing arrangements well-known in the telegraph art, the slots 25 and 27 may be correlated with the spatial phase of the beams from beacons 1 and 2. In other words, at any given instant of time, the slots 25 and 26 are in space phase and rotate in synchronism with the corresponding beams from beacons 1 and 2. Therefore the scanning discs are illuminated only when the two beams from beacons 1 and 2 are simultaneously acting on the antenna 13 on the aircraft. By suitable choice of the rate of rotation of the beacons, this illumination of lamp 29 can be repeated at a rate within the persistency of vision, so that the illumination appears to be continuous. However, since discs 23 and 24 are continuously rotating, the light which is visible will be in the form of a spot determined by the intersection of the two slots 25 and 26. The location of this illuminated spot can therefore assume any angular relation around the disc and can assume any radial relation thereon. The position of this illuminated spot at any given instant will therefore be determined by the position of the aircraft with respect to the two radiating beacons.

The disc 23 may be located close to a transparent map plate 30 (Fig. 2) so that the appearance of the illuminated spot will show directly on the map the location of the aircraft with respect to the two fixed points representing beacons 1 and 2. The position of this illuminated spot on the map will therefore change as the aircraft changes its azimuthal position with respect to the two beacons.

Also associated with the scanning discs are a series of other gas discharge lamps 31, 32 there being one for each of the repeaters such as repeater 4. If desired, each of these lamps may produce a light of a distinctive color. As above described, when the repeater 4 is triggered, there results a signal F3 which is picked up by the antenna 13 and is selected by an appropriate filter 16 and detected in the detector 33. If desired, each of the transmitters 4 may be modulated with a distinctive frequency. Therefore there is more than one region or object to be identified similar to region 3, the transmitter 4 located at each of these objects or regions can be modulated by a characteristic frequency which may also identify the altitude of the object. The output of detector 33 is applied to a plurality of filters 34, 35 of which there is one for each of the repeaters 4. Connected to each of the filters 34, 35 are corresponding "peaker" circuits 36, 37 which are connected respectively to the lamps 31 and 32. Since these lamps produce light of different colors, the observer on the moving craft is not only able to determine the orientation of the particular region or object 3 from which the repeater signal is being received, but also the altitude or other distinguishing characteristic of the region or object. The invention is not limited to the location of the repeater transmitters 4 and associated receivers 5 at fixed points. If it is desired to indicate the location and relative altitude of another aircraft, the same principles above described may be employed, thus the other aircraft will have equipment identical with that represented within the dotted rectangle 11. In addition, the other aircraft will have its own transmitter 38 (which corresponds to transmitter 4) which may be modulated at a characteristic frequency under control of the usual altimeter 39. In other words, the radiated signal from the other aircraft transmitting antenna 40 will be modulated with a different frequency corresponding to the other aircraft's altitude. However the transmitter 40 of the other aircraft will only be radiating when its receiving antenna 13 is simultaneously excited by both of the beams from beacons 1 and 2 under control of the selecting circuit 28 as above described. Therefore the antenna 40 of this other aircraft will function in substantially the same way as the antenna 4A above described. In other words, the other aircraft can function as a repeater similar to repeater 4 and its repeater function is controlled by the simultaneous excitation of its omni-directional receiving antenna 13 simultaneously by both of the beacons. Therefore, the aircraft will be identified by a corresponding frequency which is selected by filter 16, and the detected modulations in this frequency corresponding to the altitude of the other aircraft will be selected by the appropriate filter 34, 35 on the aircraft under consideration, and the illumination of the corresponding lamp 31, 32 will not only give an indication of the location of the other aircraft, but also its relative altitude. While the drawing shows two separate light sources 31 and 32 for identifying two altitudes, it will be understood that a greater number of lamps and a corresponding greater number of filters 34, 35 may be employed depending upon the number of objects or landmarks to be identified or the number of aircraft to be identified.

While one particular embodiment of the invention has been disclosed herein, various changes and modifications may be made without departing from the spirit and scope of the invention.

I claim:

1. The method of indicating the relative positions of a receiving point with respect to a plurality of radiating and reradiating points which comprises, scanning the region of space around said radiating points by a pair of rotating radio beams originating at said radiating points and rotated at relatively different speeds, reradiating energy from said reradiation points when said beams are both aligned therewith, producing scanning motions at said receiving points synchronized with rotation of said beacons from spaced points representing in scale the distance between said radiators, and causing indications to represent the position of said receiving point relative to said radiating points and said reradiating points in response to the operation of said scanning motions and the simultaneous reception of said beams and the reception of said reradiated energy respectively.

2. The method of indicating the orientation of a receiving point with respect to a plurality of distant radiating sources of the sharply directed beacon type and with respect to at least one object spaced from said sources which comprises, rotating the beacons at relatively different rates to scan a region of space therearound and including said object, reradiating from said object radio signals only when said object is simultaneously aligned with both of said beacons, at the receiving point continuously scanning in successive elemental spots an area representing said region, illuminating said scanning area when said beacons are simultaneously acting on the receiving point and when said beacons are simultaneously acting on said object.

3. The method of indicating the orientation of a receiving point with respect to a plurality of distant radiating sources of the sharply directed beacon type and with respect to at least one object spaced from said sources which comprises, rotating the beacons at relatively different rates to scan a region of space therearound and including said object, reradiating omni-directionally from said object radio signals only when said object is simultaneously aligned with both of said beacons, at the receiving point continuously scanning in successive elemental spots an area representing said region, illuminating said scanning area by one light source only when said beacons are simultaneously acting on the receiving point, and illuminating said scanning area by the other light source only when said beacons are simultaneously acting on said object.

4. The method according to claim 3 in which said other light source illuminates said scanning area with light of a different color from the first-mentioned light source.

5. The method according to claim 3 in which said scanning area is illuminated by a plurality of other light sources of different colors, said colors being correlated with predetermined characteristics of said object.

6. A system for indicating the relative positions of a receiving point with respect to a plurality of radiating and reradiating points which comprises a pair of rotating radio beams originating at said radiating points, means for rotating said beams at relatively different speeds to scan the region of space around said radiating points, means for reradiating energy from said reradiation points when said beams are both aligned therewith, means for producing scanning motions at said receiving points synchronized with rotation of said beacons from spaced points representing in scale the distance between said radiators, and means for producing indications to represent the position of said receiving point relative to said radiating points and said reradiating points in response to the operation of said scanning motions and the simultaneous reception of said beams and the reception of said reradiated energy respectively.

7. In a system of the character described, means to develop a pair of sharply directed radio beacons rotating at different rates, a repeater located at a point whose position is to be indicated, said repeater having omni-directional radio receiver means and an omni-directional radio transmitter, means to key said transmitter only when said receiver picks up signals from the beacons simultaneously, a radio receiver located at another movable point whose position is to be indicated with relation to said first-mentioned point, means at said movable point for producing on a scanning area representing the scanning region of said beacons two luminous spots, one of said spots following the movement of the said movable point with respect to said beacons, and the other of said spots following the movement of said movable point with relation to said first-mentioned point, means to control the first spot by the direct radiations from said beacons to said radio receiver at the movable point, and means to control the other spot by the radiations of said radio transmitter to said radio receiver at said movable spot.

8. A system according to claim 7 in which said beacons radiate characteristic signals which are different from the signals radiated from said radio transmitter.

9. A radio position indicating system for providing indications of the location of an object with respect to a receiver at a movable point, comprising a pair of highly directive radio beacons radiating at relatively different rates, a repeater located at said object and having a radio transmitter which is keyed on only when both said beacons are aligned with said object, means at said movable point to receive the radiations from said beacons and to receive the radiations from said repeater, means at said movable point to develop a luminous spot whose position varies in accordance with the variation in position of said movable point with respect to said object, and means at said movable point to produce another luminous spot whose position varies in accordance with the variation in position of said movable point with respect to said beacons.

10. A radio position indicating system according to claim 9 in which said repeater includes an omni-directional radio receiver which controls said radio transmitter, and the said means at said movable point to receive radiations from said beacons is also of the omni-directional receiving type.

11. A radio position indicating system according to claim 9 in which said beacons operate at different characteristic frequencies, and said radio transmitter also operates at a characteristic frequency which is different from the beacon frequencies.

12. A position indicating system for indicating the position of a receiving point with relation to at least three other points, a pair of rotating directed radio beacons at two of said three points, a repeater-transmitter at said third point, omni-directional means at said receiving point for receiving radiations from said three points, indicator means at said receiving point for producing a visual indication when both said beacons are in radiating alignment with said receiving point and for producing another visual indication when said beacons are both in alignment with said object, and electro-optical scanning means for moving said indications over a mapped field to show continuously the position of said receiving point with respect to said beacons and with respect to said object.

13. A receiving arrangement for producing positional indications comprising means to receive directional radiations from two sources whose geographical locations are known, and to receive omni-directional radiations from the third source whose geographical location is to be determined, each of said radiations having a different signal characteristic from the remaining radiations, means connected to the receiving means to separate said signals into three channels two of which are derived respectively to the said two sources and the third derived from said third source, a visual position indicator having spot-by-spot scanning means with two synchronizing elements therefor, means to connect said two channels respectively and individually to said synchronizing elements, means to control the illumination of said scanning spot, and means to connect said two channels compositely to said illumination control means so that said spot is illuminated only when said receiving means is receiving directional radiations from said two sources simultaneously.

14. A receiving arrangement according to claim 13 in which said scanning means is provided with a scanning field arranged to be illuminated by an additional source of illumination, and said additional source of illumination is provided with a control circuit which is connected to the third of said three channels.

15. A position indicating control arrangement for aircraft and the like comprising a radio receiver for receiving directional radiations from a plurality of highly directive rotating radio beacons whose geographical positions are known, a radio transmitter associated with said receiver and arranged to be keyed on under control of said receiver only when said receiver is receiving directional radiations from both of said beacons simultaneously, a spot-by-spot scanning device associated with said receiver and having a plurality of synchronizing elements for controlling the movement of the scanning spot in synchronism with the radiation of said beacons, means connecting said synchronizing elements to said receiver for respective control by said beacons regardless of whether said beacons are acting simultaneously on said receiver, and means to control the illumination of said spot only when said receiver is being acted upon simultaneously by both said beacons.

16. In a radio beacon system, a pair of radio beacons each having means for transmitting a sharply directive radio beam, and means for rotating said beams at different rates of speed, and a repeater station comprising means for receiving energy from said two beams, a transmitter, and means for rendering said transmitter operative in response to simultaneous reception of said two beams.

17. In a radio beacon system wherein energy is transmitted in the form of sharply directed beams from two spaced radiating points, and energy of a different characteristic is transmitted from a repeater in response to simultaneous reception of energy from both said beams; a receiver comprising means for receiving energy radiated from said radiating points and from said repeater, indicator means to produce synchronous rotary scanning motions, and means responsive to said scanning motions and receipt of said energy to produce an indication of the relative positions of said receiver, said radiating points and said repeater.

18. A beacon system according to claim 17, wherein said indicator means comprises a pair of rotatable shutter discs having their axes spaced a distance representing the spacing of said radiating points and provided with slots, means for rotating said discs in synchronism with the rotation of said beams whereby said slots represent in position the position of said beams, and means for producing an illumination of at least one of said slots in response to reception of said energy, whereby an illuminated spot is produced corresponding to the position of said receiver and said repeater.

19. A beacon system according to claim 17, wherein said radio beams have different signal characteristics and said receiver further comprising means for separating said different signal characteristics and means for producing an indication differing in character in response to the received beacon energy and the energy from said repeater.

20. A radio navigation system comprising a pair of spaced apart radio beacons each having means for transmitting different and directive beams of radiant energy, means for rotating said beams at different rates of speed, a remote receiving station, means for locating the position of said receiving station from said pairs of radio beacons, comprising means at said receiving station for receiving said beacon transmitted energies, means synchronized with the rotation of each of said beacons for producing an indication of beacon signals simultaneously received by said receiving means whereby the bearing and distance of said receiving station with respect to said beacon is determined.

21. A radio navigation system comprising a pair of spaced apart radio beacons each having means for transmitting different and directive radio signals, a receiving station, means at said station for receiving said radio signals, means synchronized with the rotation of each of said beacons for continuously indicating the direction of transmission of said beacons, and means responsive upon simultaneous reception of said beacon signals by said receiving means for indicating the position of said receiving station with respect to radio beacons.

22. An arrangement as set forth in claim 20, further comprising a repeater station responsive to the simultaneous reception of radio beacon signals for transmitting radio signals having a predetermined characteristic, said receiving means responsive to said transmitted repeater signals for indicating the position of said repeater with respect to said radio beacon system.

23. An arrangement as set forth in claim 21, further comprising a repeater station responsive to simultaneous reception of said beacon signals for transmitting radio signals having characteristics, said receiving means responsive to said transmitted repeater signals for indicating the position of said repeater station with respect to said beacon system.

24. An arrangement as set forth in claim 21, wherein said receiving station further comprises means responsive to the simultaneous reception of said beacon signals for transmitting signals having predetermined characteristics.

HENRI G. BUSIGNIES.

REFERENCES CITED

The following references are of record in the file of this patent:

UNITED STATES PATENTS

| Number | Name | Date |
| --- | --- | --- |
| 2,132,599 | Baumann et al. | Oct. 11, 1938 |
| 2,252,083 | Luck | Aug. 12, 1941 |
| 2,321,698 | Nolde | June 15, 1943 |